A. MULLER.
Machines for Treating Scale-Boards.

No. 150,880. Patented May 12, 1874.

WITNESSES
INVENTOR
Adolph Müller

UNITED STATES PATENT OFFICE.

ADOLPH MÜLLER, OF JERSEY CITY, NEW JERSEY, ASSIGNOR OF PART OF HIS RIGHT TO JACOB KOHLBERG AND T. H. WALSH, OF NEW YORK CITY, AND CHARLES EISENHUT, OF JERSEY CITY, NEW JERSEY.

IMPROVEMENT IN MACHINES FOR TREATING SCALE-BOARDS.

Specification forming part of Letters Patent No. 150,880, dated May 12, 1874; application filed March 7, 1874.

*To all whom it may concern:*

Be it known that I, ADOLPH MÜLLER, of Jersey City, in the county of Hudson and State of New Jersey, have invented a new and valuable Improvement in Machines for Treating Scale-Boards; and I do hereby declare that the following is a full, clear, and exact description of the construction and operation of the same, reference being had to the annexed drawings making a part of this specification, and to the letters and figures of reference marked thereon.

Figure 1:
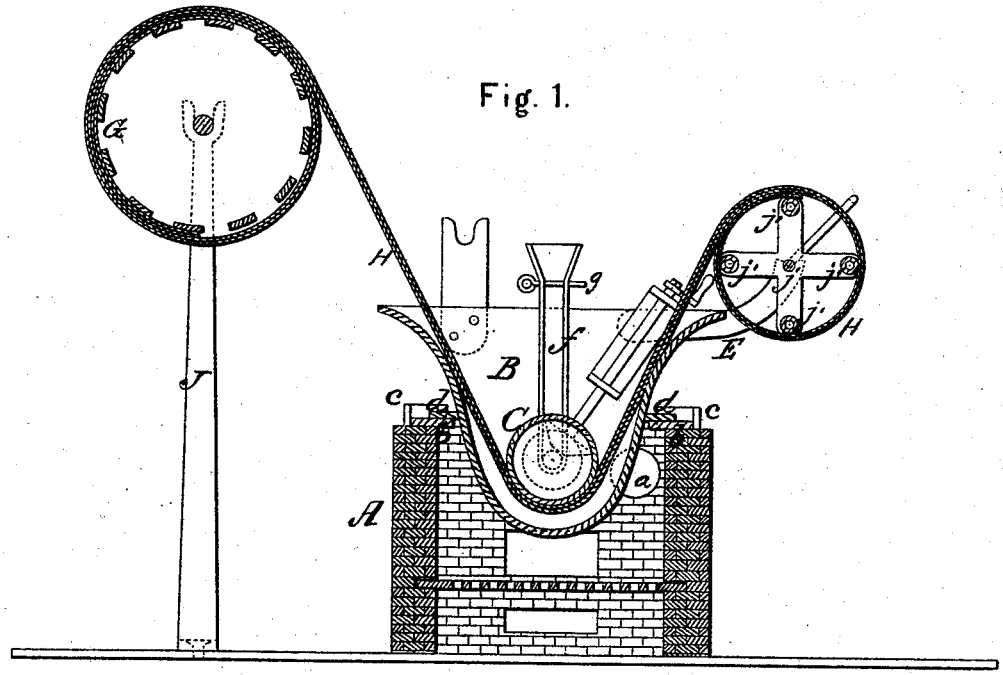
Figure 2:
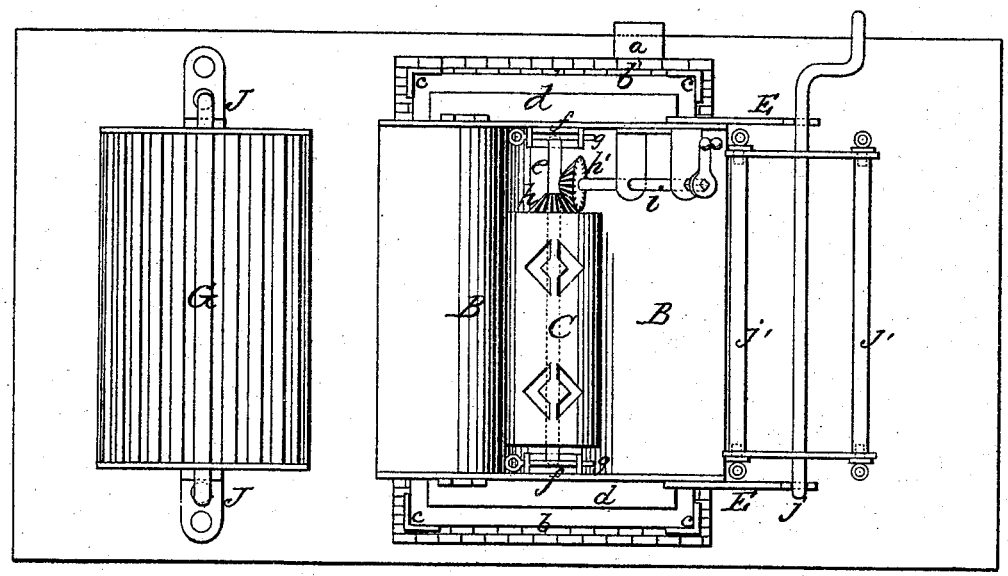

Figure 1 of the drawing is a representation of a sectional view of my machine. Fig. 2 is a plan view of the same.

This invention has relation to machinery which is especially designed for treating veneers or scale-boards in the manufacture of pipes. It consists in certain novel means for rolling up and unrolling the scale-boards and subjecting them to the asphalt in a heated state, and then cooling them to the proper temperature for winding them on a pipe-forming mandrel.

In the machine for making drain-pipes for which Letters Patent were granted to me, bearing date September 16, 1873, the pan in which the scale-boards were saturated and coated with asphalt required to be at least as long as these boards, and the sheets or boards were drawn directly out of the pan and wound upon the pipe-forming mandrels. The long pans are objectionable for many reasons, chiefly, however, because of the space they occupy, and because of the difficulty of keeping the scale-boards submerged in the melted asphaltum. It is also objectionable to wind the scale-boards upon the pipe-forming mandrels directly from the highly-heated and very fluid asphaltum. These objections I have obviated by my present invention, which I will now describe.

In the annexed drawings, A designates a brick-work furnace of any suitable capacity, and $a$ designates the smoke-pipe, which is carried out of one end of the furnace. On top of this brick-work I adjust, loosely, a rectangular frame or flange, $b$, which may be held in place by means of rectangular corner-pieces $c$, fixed into the brick-work. B represents the pan in which the asphaltum is melted and kept in a very fluid condition at a temperature of about 300°. The lower part of this pan is semicircular, and that part of the pan which rises above a flange, $d$, flares upwardly and outwardly, as shown in Fig. 1. The flange $d$ on the outside of the pan B surrounds it, and rests closely upon the frame or flange $b$. By thus setting the pan it can be readily removed from the furnace A without injuring the brick-work thereof, and the expansion and contraction of the pan—which I make of cast-iron—will not crack or break down the furnace-walls, nor cause the same to leak smoke and gases. Inside of the pan B I apply a submerging-drum, C, the ends of the shaft $e$ of which turn in guides $f\ f$, constructed on the ends of the pan and rising a short distance above the same, where they are provided with pin-supports $g\ g$, for a purpose hereinafter explained. One end of the shaft $e$ of drum C has a beveled spur-wheel, $h$, keyed on it, which engages with a similar spur-wheel, $h'$, on the lower end of an inclined shaft, $i$, on the upper end of which a hand-crank is formed. The shaft $i$ is vertically movable, so that the wheel $h'$ can be raised out of the way when it is desired to lift the drum C out of its guides $f$. E E are two upwardly-curved arms, which are forked, to receive and form bearings for the ends of a reel-shaft, $j$, on which a hand-crank is applied for turning the reel. The reel-shaft $j$ has radial arms secured to it near its ends, to which arms hollow or tubular reel-bars $j'$ are secured, through which heated air is forced, for the purpose of warming them previous to winding the prepared scale-boards upon the reel. The scale-boards, which are composed of strips of wood veneer or scales crossed and sewed together, are wound upon a drum, G, which is removably applied upon the upper ends of two standards, J J, and arranged in close relation to the pan B, and parallel thereto. Any desired number of the scale-boards H may be wound upon the drum G, and a number of these drums so filled will be kept ready for use. When the drum G on one side of the pan and the reel on the other side thereof are properly mounted, and the asphaltum in the pan has been heated to the proper temperature, one end of a scale-board, H, is passed beneath the drum C, and carried up and passed around the reel, the hollow bars $j'$ of which should be properly heated. The reel is then rotated slowly, and as the scale-board is moved through the fluid asphaltum it will become thoroughly saturated with this substance. The reel is then moved away from the furnace, and the scale-boards allowed to cool to a temperature of from 100° to 150° Fahrenheit, at which temperature the scale-boards are in a proper condition for being wound upon a mandrel and formed into pipes.

Instead of winding the scale-boards upon reels, as above described, the boards may be wound upon the drum C in the bath of asphaltum, after which the drum C can be raised out of the bath by any convenient means, and supported at the upper ends of the guides $f$ upon the pins $g$. When the treated scale-boards are properly cooled they are wound off the drum C upon the pipe-forming mandrel, which is fully described in my Letters Patent above referred to.

What I claim as new is—

1. In the process of impregnating and coating scale-boards or wood veneers with asphaltum, the combination of a submerging-roller, C, which is vertically movable in guides $f$, applied in the pan B, the spur-wheels $h\ h'$, and crank-shaft $i$, substantially as described.

2. The combination of the removable drums C G and a reel with the pan B, as and for the purposes described.

In testimony that I claim the above I have hereunto subscribed my name in the presence of two witnesses.

ADOLPH MÜLLER.

Witnesses:
CHAS. C. OVERTON,
T. H. WALSH.